May 7, 1940. F. WOLF 2,199,845

UTILIZATION OF DISCARDED TIRES

Filed March 31, 1939

INVENTOR
FRANK WOLF
BY J.H.G.Cook
ATTORNEY

Patented May 7, 1940

2,199,845

UNITED STATES PATENT OFFICE 2,199,845

UTILIZATION OF DISCARDED TIRES

Frank Wolf, High Ridge, Mo.

Application March 31, 1939, Serial No. 265,182

3 Claims. (Cl. 150—50)

This invention relates to the utilization of discarded tires. Heretofore when automobile tires became so badly worn that it was necessary to replace them, the worn-out tires were generally regarded as junk, although I am aware that mats have been fashioned out of such discarded tires. The principal object of my invention is to make useful articles other than mats from discarded tires, for instance, receptacles of various kinds, such as jardinieres, vases, boxes, and other articles of like nature. These articles can be made at the minimum of expense, the cost of the tires being negligible since they can be purchased as junk, and very little in the way of additional materials being required. It is preferable to use tires whose inner walls are intact. The receptacles which I make through the use of my invention are not only of utilitarian nature, but also can be decorated in such a way as to introduce a note of color in a house or garden wherever desired. An additional advantage of my invention is that the receptacles which I produce are practically unbreakable, even when accidentally dropped upon a hard surface, for instance, a concrete floor.

While it is understood that receptacles of various kinds can be made through the use of my invention, for the purpose of simplifying this application I have illustrated, and will describe, a jardiniere made in accordance therewith.

When I have secured a tire which has outlived its usefulness on the wheel of an automobile, or the like, I first bend the two flaps 1 and 2, which form the inner wall of the tire, outwardly at the point where they join the tread 3, and preferably (though not necessarily) cut off a portion of the flap 1 around its free edge equidistantly at all points from the tread 3, so that said flap 1 will be somewhat narrower than the flap 2.

Figure 1:
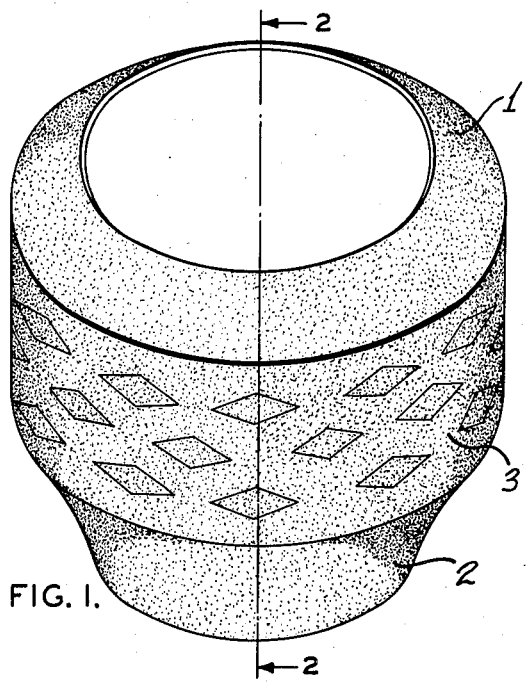
Fig. 1 is a perspective view of a receptacle made in accordance with my invention.
Figure 2:
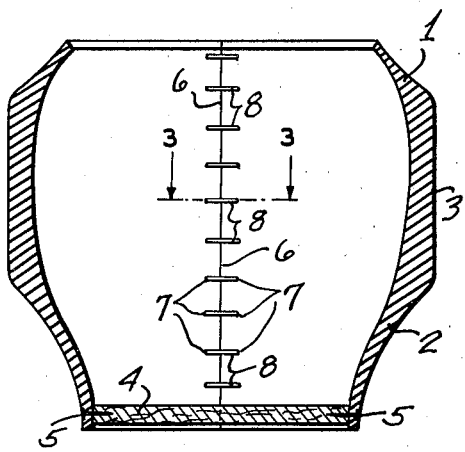
Fig. 2 is a cross-sectional view taken on line 2—2, Fig. 1, showing the seam of said receptacle.
Figure 5:
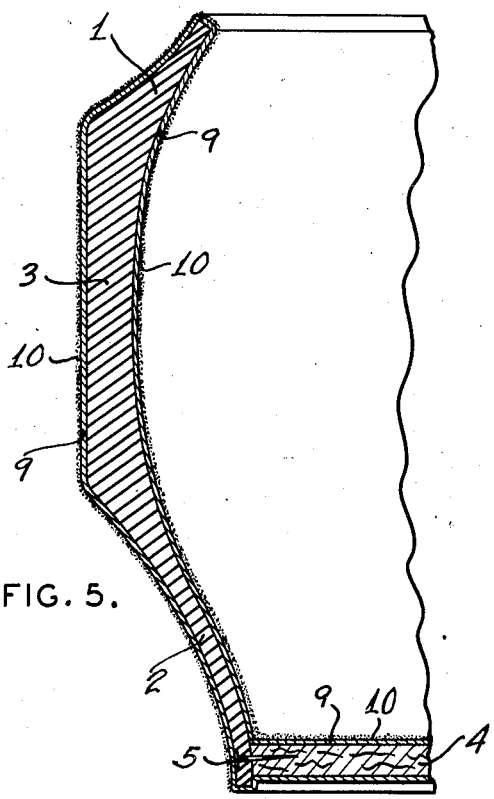
Fig. 5 is an enlarged, cross-sectional view of said receptacle, partly broken away.

In the event it is desired to produce a rather large jardiniere, one that would be particularly suitable for outdoor use and of about the same circumferential dimension as the tire from which it was made, I now have the circular wall of my jardiniere, consisting of the tread 3 and the flaps 1 and 2, the flap 1 being at the top of said jardiniere and the flap 2 at the bottom, so that the opening at the top of the jardiniere is of larger diameter than the bottom opening. A flat, circular, wooden element 4 is now introduced interiorly of said wall (Figs. 2 and 5), said element being of approximately the same diameter as the lower, inside diameter of the flap 2, so that said element 4 can be tightly wedged thereinto, thus forming the floor of the jardiniere. Nails 5 are driven horizontally through the flap 2 and into the wooden floor 4 to further secure said floor in place and prevent accidental dislodgement thereof.

Figure 3:
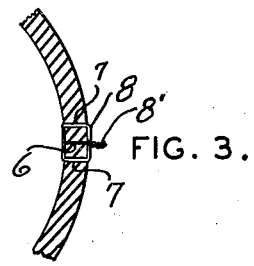
Fig. 3 is a fragmentary, cross-sectional view taken on line 3—3, Fig. 2, illustrating a detail of the seam of said receptacle.
Figure 4:
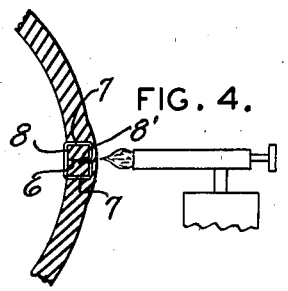
Fig. 4 is a fragmentary, cross-sectional view similar to Fig. 3.

I will now set forth the steps necessary to produce a jardiniere of smaller diameter than the one just described, as follows:

After bending outwardly the flaps 1 and 2, I cut out transversely of the tire a portion of such width as to leave the remaining portion of the tire of approximately the same length as the circumference of the jardiniere which I wish to make. It is important that the two cuts necessary to remove said transverse portion be made along perfectly straight lines, as at 6, since if said cuts are even slightly diagonal, or curved, the finished jardiniere will not be absolutely symmetrical. Having bent the flaps 1 and 2 outwardly, I cut off a portion of the flap 1 at its free edge, as heretofore described. I now bring the transversely cut edges 6 of the tire together so that they touch each other (Fig. 2) preparatory to forming a seam at the point of contact. Perforations 7 are then made through the tire opposite each other on each side of the cut edges 6 at a slight distance from said cut edges and copper wire 8, or any preferred, non-rustable wire, is laced through pairs of said perforations (Fig. 2), the ends of said wire 8 being cut off to leave sufficient wire to be twisted, as shown at 8' (Fig. 3). The twisted wire ends 8' are then bent and forced in between the cut edges 6 of the tire (Fig. 4), which has the effect of lacing said cut edges 6 securely together. Through the use of a blow torch, or any other suitable instrument, heat is then applied to the outer surface of the tire along the cut edges 6 to soften the tire (Fig. 4), and when it has become sufficiently plastic the material of which the tire is made is smeared, or spread evenly, over the cut edges 6 and over the wire lacings 8 until said cut edges and lacings are covered and entirely concealed, and the seam presents an even surface with the remainder of the tire. Also, if there are any rough spots on the outer surface of the tire, heat from the blow torch is applied to them and they are smoothed down in the same manner, so that the whole tire has a smooth, unbroken outer surface. At the places where heat has been applied and the material of the tire has become tacky, powdered sulphur is spread over such soft spots, which has the effect of bringing the material back to its original condition. The outer wall of the jardiniere has now been formed, and the wooden floor member 4 is secured therein in the same manner as described heretofore in connection with the larger jardiniere.

The entire inside surface of the jardiniere, whether of the first-described larger dimensions or the smaller size, is now covered with liquid asphalt 9, which serves a two-fold purpose, in that it renders the inside of said jardiniere waterproof (the outside, being rubber, is already waterproof) and also presents a surface which is capable of holding paint. After the liquid asphalt has become dry, the surface of the jardiniere is painted, preferably both inside and outside, usually a solid color on the inside and with decorative designs in various colors on the outside, and while said paint is still wet, sand or ground glass 10 is sprinkled or sprayed over the painted surface for the purpose of making said surface more durable and practically impervious to weather conditions, and also to impart a glistening appearance to the finished jardiniere.

As said before, while I have described the invention in connection with the production of a jardiniere, it is to be understood that many other types of receptacles can be made in the same manner.

I claim:

1. A method of utilizing discarded tires to produce receptacles, which consists of bending the flaps of the inner wall of a tire outwardly at the point where they join the tread of said tire, cutting a section transversely from said tire, lacing the cut edges of said tire together, softening the material of said tire at said cut edges and spreading said softened material over said cut edges and over said lacing, applying a hardening agent to said softened material, securing a floor member into the lower of said flaps near its free edge to form a receptacle, and covering the inner surface of said receptacle with a waterproofing medium.

2. A method of utilizing discarded tires to produce receptacles, which consists of bending the flaps of the inner wall of a tire outwardly at the point where they join the tread of said tire, cutting a section transversely from said tire, perforating said tire near its cut edges and introducing wire lacing elements into said perforations to hold said cut edges securely in contact with each other, twisting the free ends of said wire lacing elements together and forcing said twisted ends between the contacting cut edges of said tire, softening the material of the tire at said cut edges and spreading said softened material over said cut edges and over said lacing elements, applying a hardening agent to said softened material, securing a floor member into the lower of said flaps near its free edge to form a receptacle, and applying a waterproofing medium to the inner surface of said tire.

3. A method of utilizing discarded tires to produce receptacles, which consists of bending the flaps of the inner wall of a tire outwardly at the point where they join the tread of said tire, cutting a section transversely from said tire, perforating said tire near its cut edges and introducing wire lacing elements into said perforations to hold said cut edges securely in contact with each other, twisting the free ends of said wire lacing elements together and forcing said twisted ends between the contacting cut edges of said tire, softening the material of the tire at said cut edges and spreading said softened material over said cut edges and over said lacing elements, applying powdered sulphur to said softened material as a hardening agent, securing a floor member into the lower of said flaps near its free edge to form a receptacle, and applying liquid asphalt to the inner surface of said tire as a waterproofing medium, painting the surface of said receptacle, and applying sand to said painted surface while wet.

FRANK WOLF.